(Model.)
W. F. CORNELL.
APPLE PARER, CORER, AND SLICER.
No. 245,453. Patented Aug. 9, 1881.
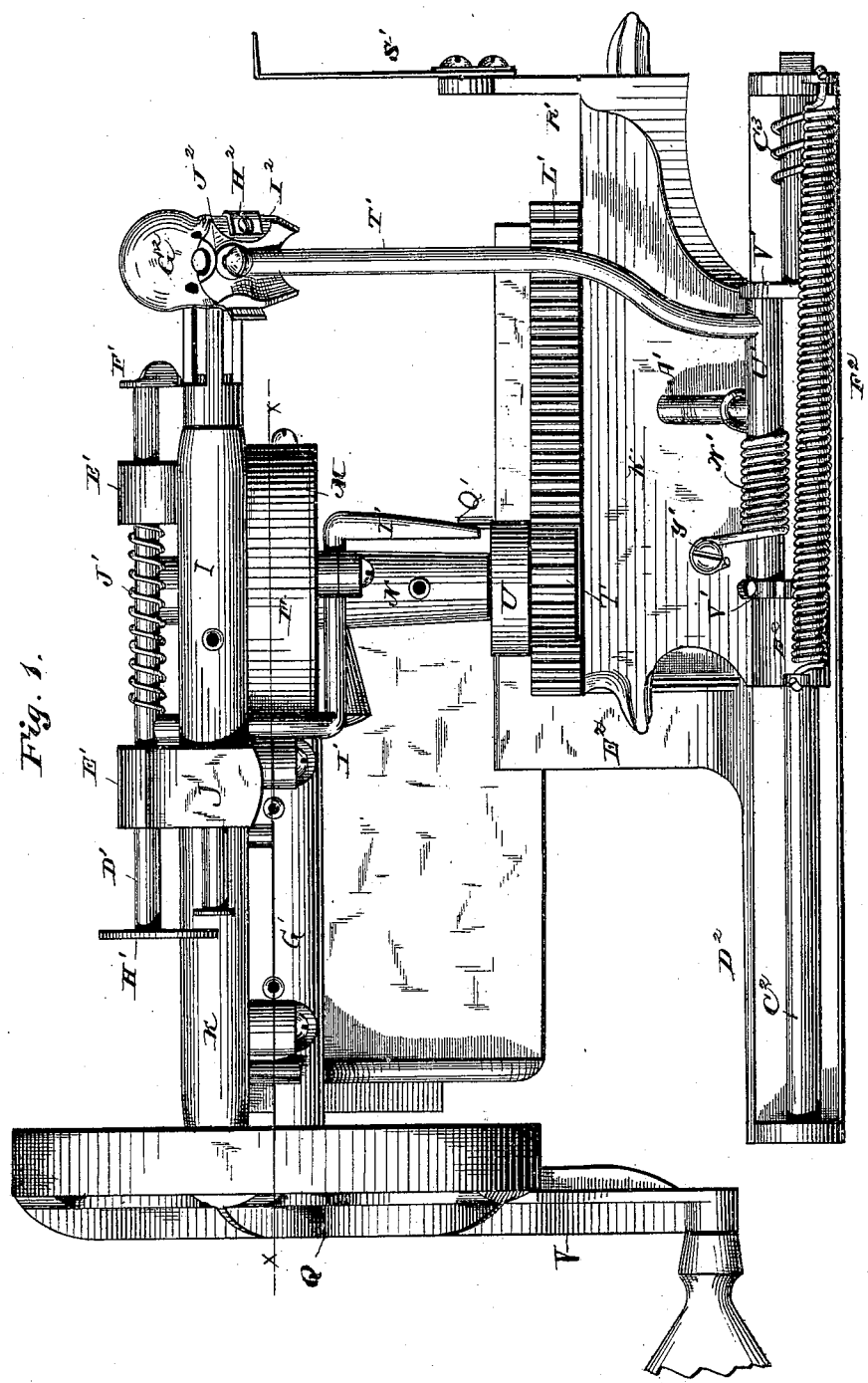

(Model.)
W. F. CORNELL.
APPLE PARER, CORER, AND SLICER.
No. 245,453. Patented Aug. 9, 1881.
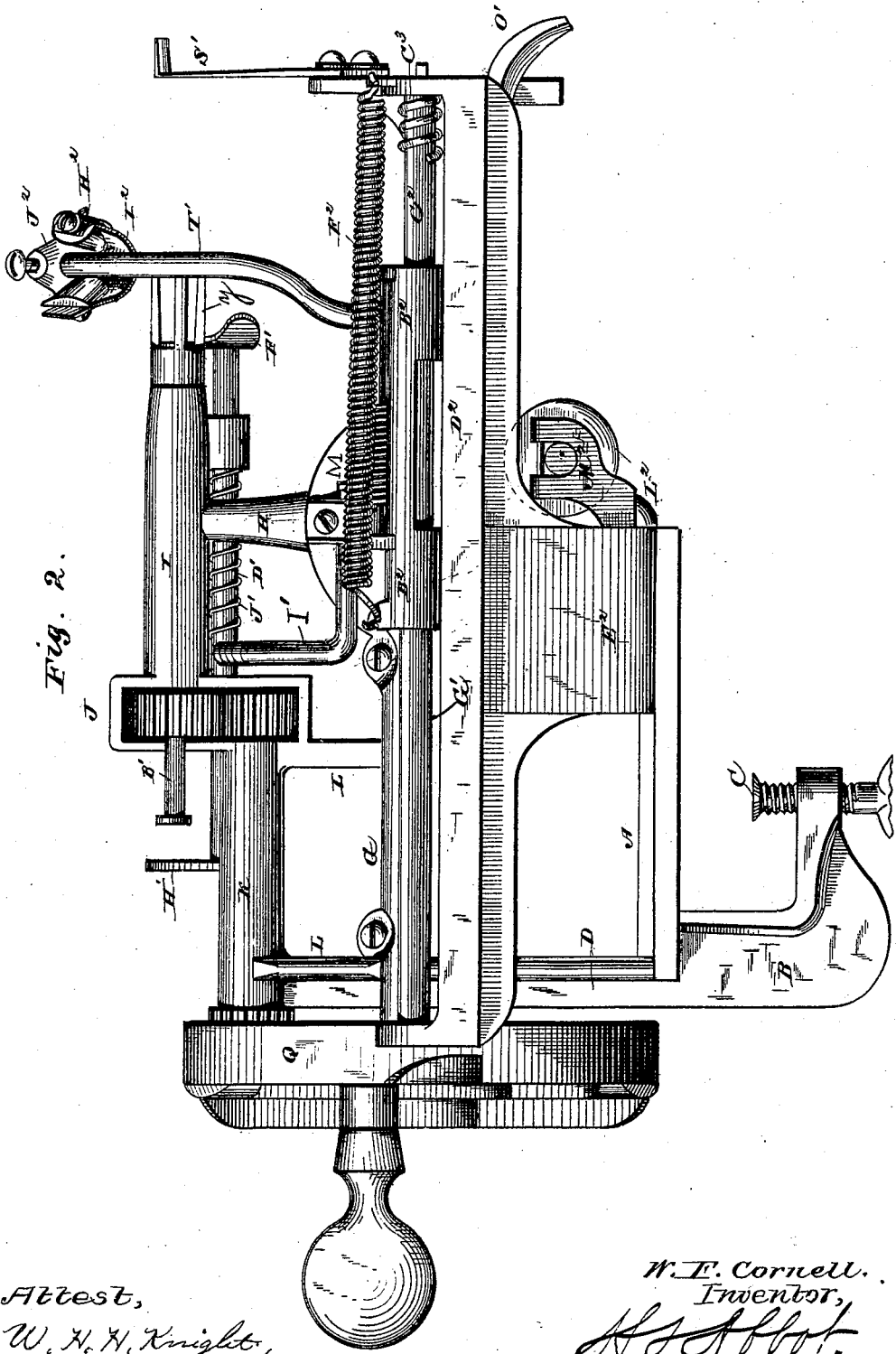

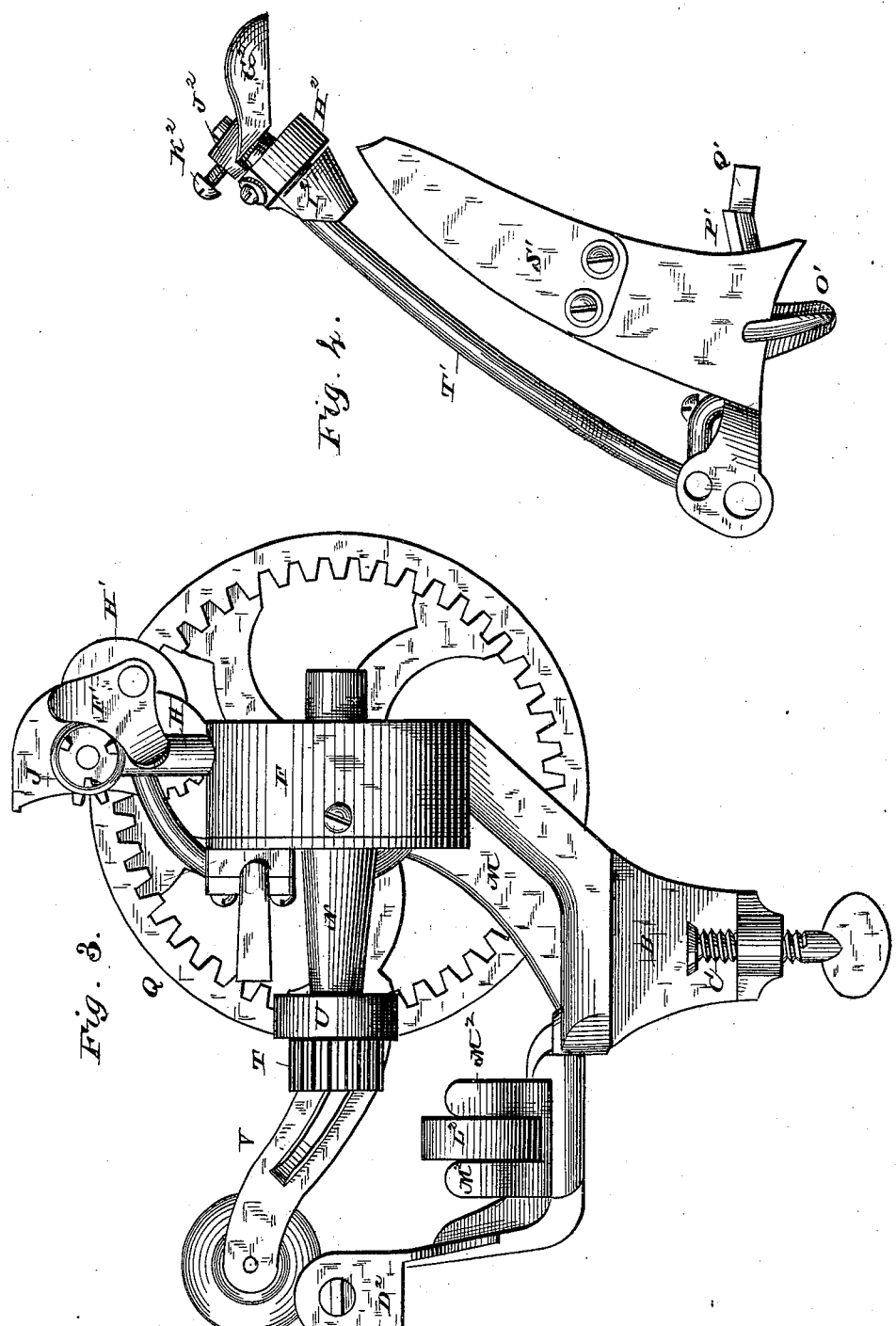

(Model.)
W. F. CORNELL.
APPLE PARER, CORER, AND SLICER.
No. 245,453.
Patented Aug. 9, 1881.
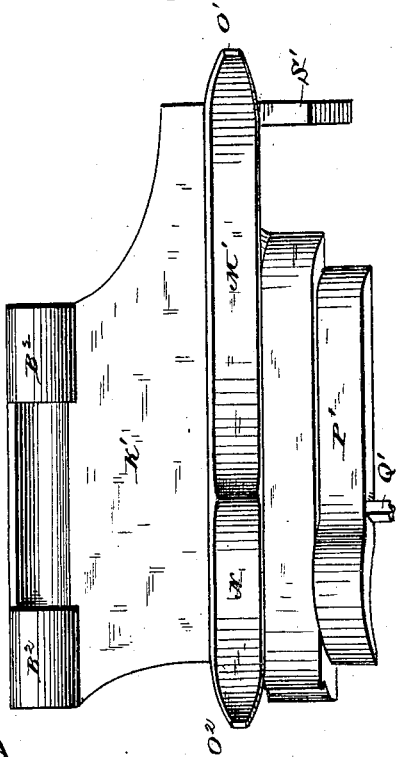
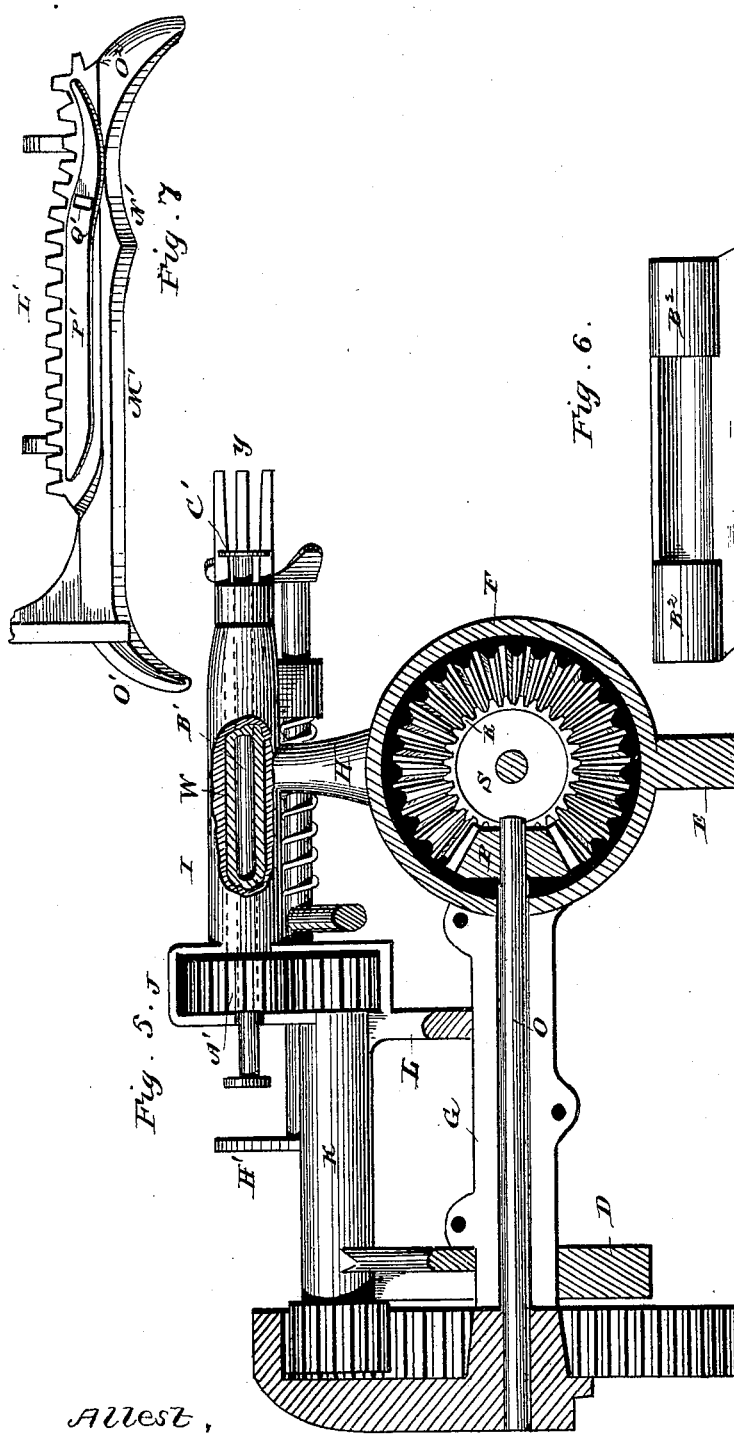

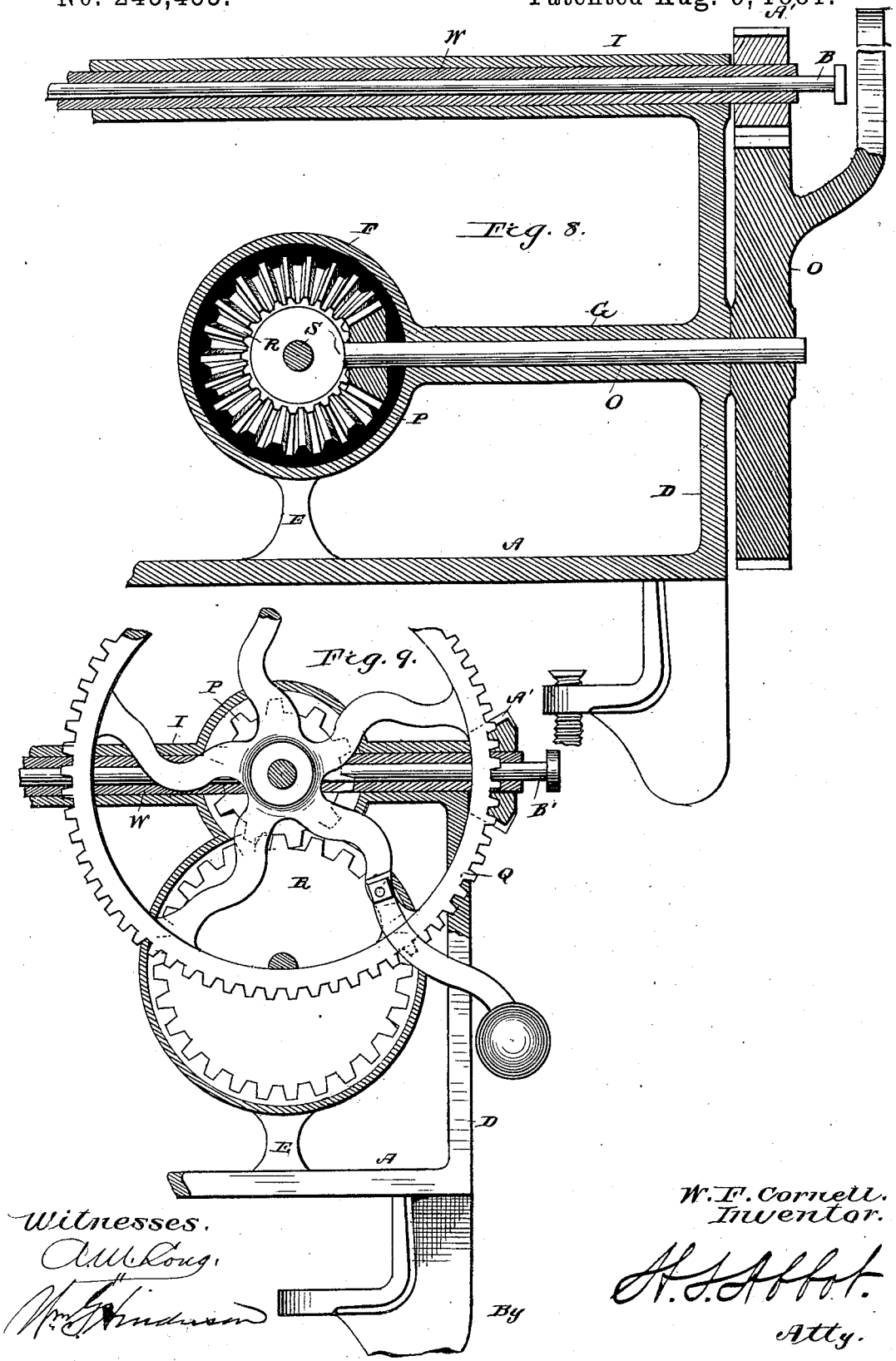

UNITED STATES PATENT OFFICE.

WILLIAM F. CORNELL, OF ADRIAN, MICHIGAN.

APPLE PARER, CORER, AND SLICER.

SPECIFICATION forming part of Letters Patent No. 245,453, dated August 9, 1881.

Application filed March 4, 1880. (Model.)

*To all whom it may concern:*

Be it known that I, WILLIAM F. CORNELL, of Adrian, in the county of Lenawee and State of Michigan, have invented certain new and useful Improvements in Apple-Parers; and I do hereby declare the following to be a full, clear, and exact description of the invention, such as will enable others skilled in the art to which it appertains to make and use the same, reference being had to the accompanying drawings, and to letters of reference marked thereon, which form a part of this specification, in which—

Figure 1 is a plan view of the device; Fig. 2, a side elevation; Fig. 3, an end view, with carriage removed; Fig. 4, an end view of carriage, with the parer and cutter and corer connected thereto; Fig. 5, a longitudinal section through $x\ x$ of Fig. 1; Fig. 6, a bottom view of the carriage; Fig. 7, a side view thereof. Fig. 8 is a vertical section of modification of Fig. 5; and Fig. 9, a modification of Fig. 8, part being broken away and part in section.

My invention relates to devices for paring, slicing, and coring apples; and it consists in the construction, and also in the combination of parts, hereinafter particularly specified.

In the accompanying drawings, the letter A indicates the base of the device, with a clamping-arm, B, and screw C projecting beneath the same from one end thereof, and two standards, D and E, extending upward therefrom.

A boxing or casing, F, (preferably of any cylindrical form,) is formed on the upper end of standard E, and from this boxing, across to the standard D, there extends one-half of a vertically-divided sleeve, G, one end thereof being joined to the standard D. From the top of casing F there rises a standard, H, to the upper end of which is connected a horizontal sleeve, I, which is joined at one end to a hood, J. To the opposite side of this hood, near the lower end thereof, there is joined one end of another horizontal sleeve, K, which is supported on standards L, resting on top of the sleeve G. These several parts are cast or otherwise formed in one piece, the sleeves opening into the casing and hood, respectively, and the relation of the several parts one to the other is clearly shown in Fig. 5 of the drawings.

A plate, M, and half-sleeve G', are cast in one piece and fitted over the open face of casing F and sleeve G, and held thereto by bolts which are passed through ears, (shown in the drawings as formed on the divided sleeve G G'.) The plate M is provided with a sleeve, N, projecting therefrom at right angles to the face thereof, and is also formed with a socket on its inside, next to its juncture with the sleeve G', into which a portion of a pinion, hereinafter described, fits.

A drive-shaft, O, passes through the sleeve G G' and has a pinion, P, (a portion of which fits into the socket in plate M,) at one end and a drive-wheel, Q, at the other. The beveled pinion P gears with a bevel-wheel, R, on a shaft, S, journaled in the sides of the casing F, and which passes through sleeve N, and has a pinion, T, on the end thereof outside of the sleeve, and on the same shaft, between the end of sleeve N and pinion T, there is placed a friction wheel or roller, U. The drive-wheel Q is provided with a crank, V, and is toothed on the inside of its face, as shown in Fig. 5. A shaft passes through sleeve K and has on each end of it a pinion. One of these pinions gears with the teeth on the face of the drive-wheel, and the other, which fits within the hood J, with a pinion on the shaft of the apple-fork. This last shaft is indicated by the letter W, and is hollow and passes through the sleeve I, and has a fork, Y, on one end, and a pinion, A', on the other, the pinion fitting within the hood J.

The core-doffer consists of a shaft, B', which passes longitudinally through shaft W, and has a disk, C', on one end cut so as to fit between the teeth of the fork Y and a head on the other end, so as to prevent it from being withdrawn from its position within shaft W.

The apple-doffer consists of a shaft, D', supported in bearings E', formed on the back of sleeve I and hood J, and is provided at one end with a plate, F', and at the other with a plate, H'. A rod, I', is connected to the shaft D', and extends forward and downward therefrom, and thence in the direction of the casing F, and through a bearing formed thereon for that purpose, and thence forward in the direction of wheel U. A spring, J', is coiled around shaft D', and bears against rod I' and bearing E', and is designed to force the shaft back to its normal position after it has been drawn forward in the operation of throwing the apple from the fork.

The carriage of this device consists of a platform, K', provided on its top, near the edge that will be next to pinion T, with a rack, L', curved near one end, as shown in Fig. 7. On the bottom of this platform there is a track, M', provided with a swell, N', as shown, and at both ends with a curved arm, O' O². In front of the rack L', and as part of the platform, there is a track, P', for the friction-wheel U, and it is curved, as shown in Fig. 7, and is provided on its edge with a stud, Q'. The relation which these several parts and their curves bear one to another is shown in Figs. 6 and 7 of the drawings. The carriage is provided at one end with an upright arm, R', to which is bolted a slicing and coring knife, S', the point of the slicing-blade being turned at right angles thereto, so as to form a coring-blade. The paring-blade is fastened to the lever T', which is connected to the shaft U', that is journaled in blocks V', cast as a part of the platform K', and a spring, W', coiled around shaft U', with one end secured to pin Y' and the other to a prong, A², that strikes against the platform and prevents the lever from being thrown too far forward, holds the paring-blade in contact with the apple, and yet allows the lever to be pushed backward, so that the paring-blade may follow the curvature of the apple. The carriage is provided with sleeves B², by means of which it is secured or hinged to the guide-rod C², along which it slides when operated. This guide-rod is set in a frame, D², which is supported on a plate, E², that is cast as a part of the base A. A coiled or equivalent spring, F², one end of which is connected to the end of the frame D² opposite to the slicing-blade, and the other to one of the sleeves B² of the carriage, is designed to draw the carriage to the forward end of the device, after it has traversed the opposite course in the operation of paring, slicing, and coring an apple, and to break the force of the blow of the carriage against the end of frame D² a coiled or other spring, C³, is placed between the two, around the guide-rod C².

The paring device, which is fastened to the end of lever T', and is adjustable lengthwise thereof, consists of a deflecting-hood, G², blade H², and bearing-surface I², the hood and bearing-surface being cast or otherwise formed in one piece, and the blade being bolted thereto. The hood is formed with a socket, J², on its back, into which fits the lever T', the hood being held thereto by means of a screw, K², that passes through the socket and bites against said lever; and by the means thus described the paring-blade may be adjusted along the length of lever T'.

A roller or wheel, L², is journaled under the platform K', in suitable bearings M², as shown in Figs. 2 and 3, and is for track M' to rest upon.

In operation an apple is forced onto the fork Y, the teeth of the fork passing through the core of the apple, and the carriage, with its paring and slicing and coring blades, stands in the position shown in Fig. 2. The drive-wheel is next turned, and from it a rotary motion is imparted by the mechanism described to the apple-fork Y and pinion T. The lever T' keeps the paring-blade in contact with the apple, and, as the apple is rotated by the means described, a thin paring is taken from the body thereof, beginning at one end and continuing by the advance of the cutting-blade until the whole apple is pared; and as the paring passes up above the blade it strikes the overhanging hood G², and is deflected downward outside of any interfence with the operative parts of the device. The paring-blade is advanced by the forward movement of the carriage, which is effected by the teeth of the pinion T engaging with the rack L' on said carriage, the shaft of the pinion being rotated by means already described. In the advancement of the carriage the slicing-blade enters the meat of the apple at one end and penetrates the same to the core, and as the apple is rotated and the carriage moved along the slicing-blade cuts the apple into a spiral ribbon, and the coring-blade cuts the core from the body of the apple, the combined operation leaving the apple in its natural form, with the exception that it is deprived of its core and is pared and spirally sliced.

The curvature in the rack L' allows the carriage, and with it the paring-blade, to be slightly elevated as the paring-blade approaches toward the center of the apple, in order that the parer may conform to or trace the contour of the apple without any undue pressure thereon. This elevation is effected by the swell N' striking the roller L², whereby, in its movement, it is elevated, the rise being gradual until the apex of the swell rests upon the roller, and thereafter gradually decreasing, lowering the paring-blade and following the outline of the apple.

During the advancement of the carriage the spiral spring F² is extended, and when the carriage has been moved forward until the pinion U has reached the end of rack L' next to the slicing-knife, and turned the corner thereof, so as to be under the platform, whereby the parer and knives are thrown back from the fork-shaft, the coils of the spring contract, drawing the carriage back to its normal position, and on its return to that position the track P' of the carriage runs upon the roller U, and when the curved portion of the track strikes the roller the carriage is slightly elevated, so as to raise the stud Q' on a line with the projecting end of rod I', which it strikes, moving it forward and carrying with it the apple-doffer, which strikes the apple, throwing it off the fork, and as the doffer-shaft is moved forward the plate at the rear end thereof strikes the end of the core-doffer, thereby moving it forward at the time that the apple-doffer is so moved, and pushing the core from the fork. As soon as the apex of the curve passes off the roller the track begins to be gradually lowered until the whole curve has passed from the roller, and in the course of this lowering the stud Q' is forced from contact with the rod I', and when the rod is thus released the coiled spring on shaft D', which was compressed during the afore-described operation, expands itself, forcing the apple-doffer back to its first position; and when another apple is placed on the fork it strikes the end of the core-doffer, forcing it back as it was before, and by continuing to turn the drive-shaft as before the operation described is repeated. These doffers may be operated by hand, if any one prefers so to do, by pressing sharply on plate H'.

The parer, slicer, and corer in its operation may be said to be automatic, and the several parts work with exact nicety, paring, coring, and slicing the apple expeditiously and without any waste of the fruit.

The curved arms O' O$^2$ assist in raising the carriage as they strike roller L$^2$, and steady the carriage by resting thereon before the body of the carriage is moved onto the same.

By incasing bevel-wheel R and pinion P and a portion of shaft S in the casing F they are protected from the juice of the apple falling thereon, which would corrode the metal and affect the satisfactory working of the parts.

Instead of having teeth on the inside of the face of drive-wheel Q, they may be on the outside of the face, in which case I make use of only one sleeve, instead of the two I and K, and I then pass the fork-shaft through this one sleeve, and secure a pinion on its end, so that it will gear with the outside gear of the drive-wheel. The construction of all the other parts is as already described for the two sleeves.

Another modification is to change the drive-wheel Q and pinion on fork-shaft to bevel-gears, and when that is done straight-faced gear is substituted for the bevel-gearing P R in casing F, and the apple-doffer changed to the back of the machine.

Having described my invention, what I claim is—

1. In an apple-parer, the combination of a revolving fork, a sliding apple-doffer, and a sliding core-doffer, operated by an oscillating and reciprocating carriage, substantially as set forth.

2. In an apple-parer, the combination of a revolving fork and sliding core and apple-doffers, the core-doffer being moved forward by the apple-doffer, and the latter so moved by a projecting arm on a traveling carriage striking a part thereof, substantially as described.

3. The platform K' provided with curve-rack L', curved track P', track M', provided with swell N, and arms O' O$^2$, for the purposes set forth.

4. In an apple corer, slicer, and parer, the combination of a traveling carriage carrying the paring, slicing, and coring blades, a rack along one edge thereof, a pinion gearing therewith and operated by suitable mechanism, a track or rod for the carriage to slide upon, and a spring to draw the carriage in the direction opposite to that in which it was moved by the pinion, for the purpose set forth.

5. The platform K', provided with a rack and tracks, as described, stud Q', and arms O' O$^2$, in combination with a rod to which the carriage is hinged and upon which it travels, a roller for the carriage to rest upon as it travels back and forth, a shaft and pinion to move the carriage in one direction, and a spring to move it in the other, substantially as described.

6. In an apple parer or corer, the combination of a fork for holding the apple, a doffer provided with a projecting arm, a carriage for moving the cutting-blade, and adapted, substantially as described, in its movements to strike the said projecting arm and move the doffer forward, for the purposes set forth.

In testimony that I claim the foregoing I have hereunto set my hand this 15th day of January, 1880.

WM. F. CORNELL.

Witnesses:
R. B. ROBBINS,
E. G. WALKER.